United States Patent
Vick et al.

(10) Patent No.: US 9,351,140 B2
(45) Date of Patent: May 24, 2016

(54) SPECIAL HANDLING OF CERTAIN TYPES OF COMMUNICATIONS

(75) Inventors: Jason H. Vick, Pine, CO (US); Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 1013 days.

(21) Appl. No.: 13/490,209

(22) Filed: Jun. 6, 2012

(65) Prior Publication Data

US 2013/0331053 A1   Dec. 12, 2013

(51) Int. Cl.
*H04W 4/22*   (2009.01)
*H04W 12/08*   (2009.01)
*H04W 88/08*   (2009.01)

(52) U.S. Cl.
CPC ............... *H04W 4/22* (2013.01); *H04W 12/08* (2013.01); *H04W 88/08* (2013.01)

(58) Field of Classification Search
CPC ..... H04W 4/22; H04W 12/08; H04W 76/007; H04W 88/08
USPC ............................................ 455/404.1, 404.2
See application file for complete search history.

(56) References Cited

U.S. PATENT DOCUMENTS

| | | | | |
|---|---|---|---|---|
| 2004/0192252 A1* | 9/2004 | Aerrabotu | ......... | H04M 3/42195 455/404.1 |
| 2007/0211867 A1* | 9/2007 | Polk | .................... | H04L 63/0823 379/45 |
| 2009/0265543 A1* | 10/2009 | Khetawat | .............. | H04L 63/104 713/151 |
| 2009/0311987 A1* | 12/2009 | Edge | .................... | H04Q 3/0045 455/404.1 |
| 2011/0064205 A1* | 3/2011 | Boni | ...................... | H04M 11/04 379/45 |
| 2012/0184238 A1* | 7/2012 | Patel | ................. | H04M 3/42195 455/404.1 |

* cited by examiner

*Primary Examiner* — George Eng
*Assistant Examiner* — Marcus Hammonds
(74) *Attorney, Agent, or Firm* — Sheridan Ross P.C.

(57) ABSTRACT

Systems and methods for providing special handling for certain types of communications are provided. More particularly, a normally secured access point can permit emergency communications to be transmitted in connection with unauthorized communication devices. Supplemental communications, for example to websites included in a predefined list by a communication device, can also be permitted once an emergency communication by that communication device has been allowed. Accordingly, emergency communications can be supported, while continuing to limit access with respect to non-emergency communications.

20 Claims, 3 Drawing Sheets

SPECIAL HANDLING OF CERTAIN TYPES OF COMMUNICATIONS

FIELD

Systems and methods for providing special handling of certain types of communications through a network access point are provided.

BACKGROUND

Wireless access points or hot spots are increasingly available. Often times, such hot spots are closed, and require a key (e.g., a network identifier and/or a password), in order to access the Internet or other networks through the hot spot. The use of closed or secured access points allows operators of such access points to control usage of the access point by communication devices.

SUMMARY

However, the use of closed access points can create difficulties. For example, a user wanting to make an emergency call may require access to the Internet through the access point where the user does not otherwise have access to a communication network. For instance, a user may be in a location where cellular telephony network coverage is unavailable. As another example, the user may have a communication device that is capable of supporting communications through network access points to which the user has access rights, but that do not provide support for communications over other channels, such as are provided by cellular telephony networks. As yet another example, a user of a communication device that is capable of supporting communications in connection with the wireless access point, and that has the credentials necessary for the access point to allow such communications, but is not currently logged on, may have a need to make immediate contact with a public safety answering point. However, because the user is not currently logged on, the user is required to provide the necessary security and/or access credentials in order to initiate contact with the public safety answering point before the call can be completed.

Systems and methods for providing special handling of certain types of communications through an access point are provided. More particularly, an access point is provided that can identify communications directed to (or from) an entity or a component of a public safety system. Where such a communication is detected, the communication is allowed to pass by the access point. Moreover, such communications are not blocked by the access point, even though the access point normally requires that a communication device provide certain predefined credentials in order to send or receive communications using the access point.

Systems in accordance with the present disclosure include an access point. As an example, but without limitation, the access point may include a wireless access point. Accordingly, the access point may be provided as part of a Wi-Fi hot spot. In addition, the access point includes an access control module for determining whether a communication received at the access point is associated with a communication between a communication device and a component of a public safety system. As examples, a component of a public safety system can include but is not limited to a public safety answering point (PSAP) or an automated alert system. If the communication is determined to be addressed to or intended for a public safety system, it is passed by the access point to a network for delivery to the public safety system. Where a communication received from a public safety system is addressed to a communication device in contact with the access point, that communication is sent to the communication device by the access point, even though the access point is normally closed to communications not associated with an authorized communication endpoint. In addition, the access point can grant access to any or a limited set of Internet addresses when a communication endpoint is determined to be initiating or engaged in a communication with a public safety system component.

Methods in accordance with embodiments of the present disclosure include receiving a communication at an access point that is normally closed to communications involving unauthorized communication devices. The access point determines whether the communication is directed to or has been received from an authorized communication device. If the communication does not involve an authorized communication device, the access point then determines whether the communication is directed to or has been received from a public safety system. For example, a determination can be made as to whether the communication is addressed to or received from a public safety system component. In response to determining that the communication is directed to or has been received from a public safety system, the communication is delivered to a connected network for delivery to the public safety system, or is delivered to the communication endpoint, even though the communication device is otherwise unauthorized. In addition, the access point can permit the communication device to exchange communications with all or a limited set of Internet addresses.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while exemplary embodiments are described, it should be appreciated that individual aspects of the embodiments can be separately claimed.

The term "communication device" as used herein refers to any mobile communication device, mobile phone, smart phone, telephone, soft phone, mobile computer, tablet computer, laptop computer, pad, tablet, computer, computer with VOIP capabilities, SIP communication capabilities, or the like.

The term "communication" as used herein refers to data exchanged between two or more communication devices, some non-limiting examples including one or more telephone calls, voicemails, emails, instant messages, text messages, multimedia messages, video messages, and the like. The techniques will be illustrated below in conjunction with an exemplary electronic communications system, such as a mobile communication system and infrastructure. Although well suited for use with, e.g., a system using a computer/electronic device, server(s), communications devices, mobile communication device(s), and/or database(s), the embodiments are not limited to use with any particular type of electronic device (s) or system or configuration of system elements. Those skilled in the art will recognize that the disclosed techniques may be used in any application in which it is desirable to provide enhanced collaboration and communication capabilities.

The terms WiFi, wireless network, wireless local area network (WLAN) and encrypted or non-encrypted WLAN's may be used interchangeably. Additionally, a wireless access point (WAP) is a device that allows one or more wireless devices to connect to a wired network using, for example, WiFi, Bluetooth®, or related standards. The WAP usually connects to a router (via a wired network), and can relay data between the wireless devices (such as computers, mobile communications devices, etc.) and at least wired device on the network.

As will be appreciated, while 9-1-1 is used an exemplary emergency contact number, other countries' equivalent emergency numbers could also be used such as the European Union's, "1-1-2" emergency number.

It is also to be appreciated that that PSAP is being used generically for one or more of the following: PSAP; MER Team (Medical Emergency Response Team) as may exist in large facilities; transit emergency response team; and/or any other entity that has jurisdiction or involvement in an emergency and/or as a first responder.

Additional features and advantages of embodiments of the present disclosure will become more readily apparent from the following discussion, particularly when taken together with the accompanying drawings.

DETAILED DESCRIPTION

Figure 1:
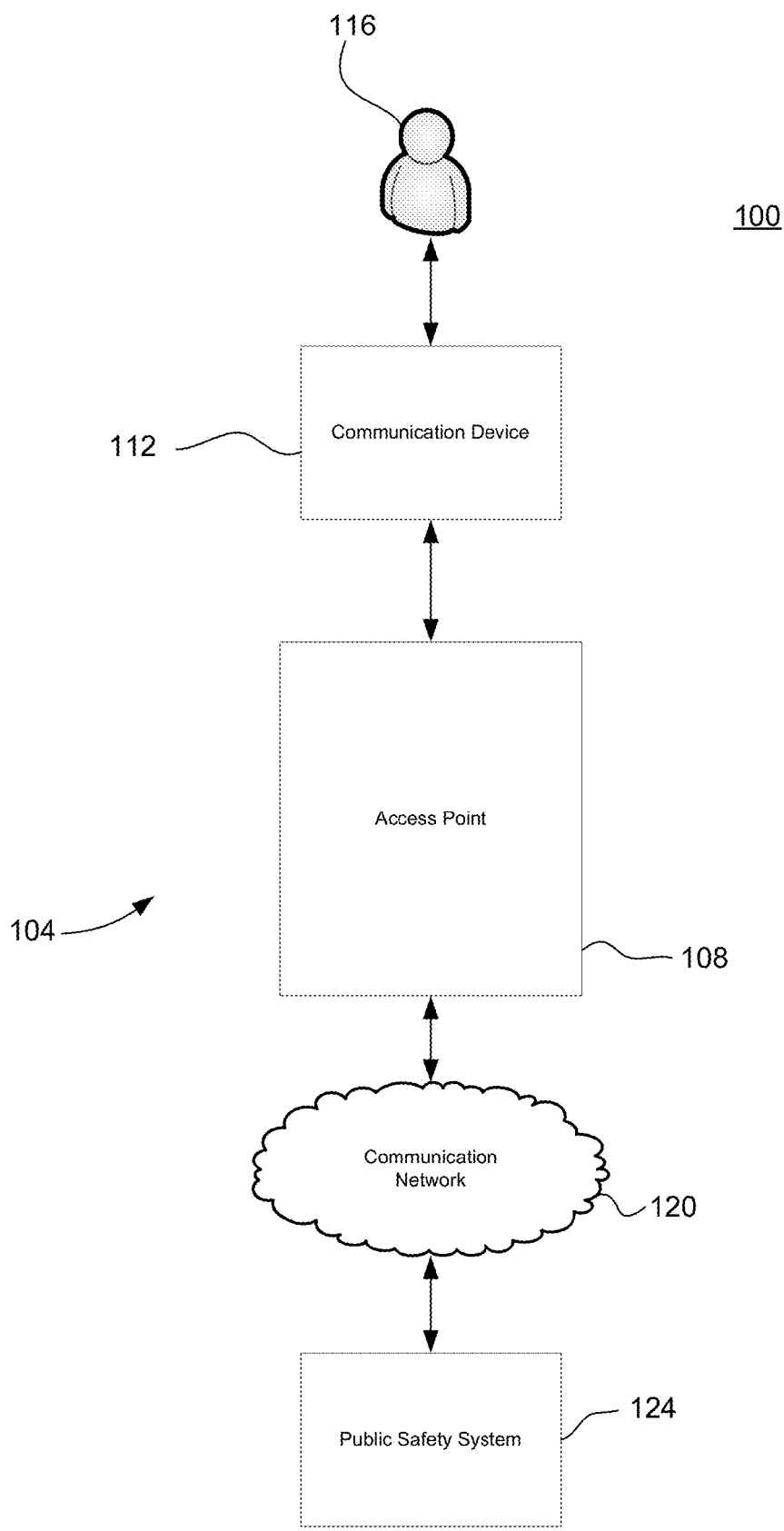
FIG. 1 illustrates components of a communication system in accordance with embodiments of the present disclosure.

FIG. 1 is an illustration of a communication system 100 incorporating a local area network 104 in accordance with embodiments of the present disclosure. The local area network 104 generally includes an access point 108 and a communication device or endpoint 112. In general, a user 116 is associated with the communication device 112. The access point 108 can provide connectivity to a communication network 120 on behalf of a connected communication device 112. The communication network 120 can, in addition to the access point 108, be connected to, directly or indirectly, various other nodes or communication devices, including but not limited to a public safety system 124 component, such as a public safety answering point or an automated alert system.

The access point 108, in an exemplary embodiment, comprises a wireless access point. For example, but without limitation, the access point 108 may comprise a Wi-Fi access point or hot spot. Alternatively or in addition, the access point can provide connectivity to one or more communication devices 112 through various other wireless and/or wired connectivity standards or protocols, including but not limited to Bluetooth, WiMax, near field communications (NFC), wireless or wired Ethernet, or any other communication standard or protocol.

The communication device 112 can comprise a device that is capable of receiving input from and providing output to a user 116. Moreover, the communication device 112 has the capability of establishing communications through the access point 108. In an exemplary implementation, the communication device 112 is capable of wireless communications, and includes a wireless communication interface. Accordingly, examples of a communication device 112 include, but are not limited to, a cellular telephone, a telephone, a soft phone, a laptop computer, a tablet computer, a personal digital assistant, a smart phone, a VOIP enabled communications device, or the like. Moreover, the communication device 112 can include support for telephony or other communication functions, for example in the form of a soft phone, and/or text messaging facility.

The communication network 120 may comprise a packet data network. Moreover, the communication network 120 may comprise a variety of networks of different types alone or in combination. Accordingly, the communication network 120 can include an enterprise network, such as a private intranet, or a public network, such as the Internet. Moreover, the communication network 120 can include the public switched telephony network (PSTN).

The public safety system 124 is generally accessible through the communication network 120. As an example, but without limitation, the public safety system can include the 9-1-1 system, the 1-1-2 system, the 9-9-9 system, and the like, which link people experiencing or witnessing an emergency to emergency dispatchers. Accordingly, the public safety system 124 can include a public safety answering point. The public safety system 124 can also include components of the emergency alert system (EAS) such as the digital emergency alert system that enables the delivery of emergency alerts to communication devices 112. The public safety system is not limited to the government regulated types of systems, but can also include local and/or private emergency response architectures and system or services as well as intra-agency emergency services.

In a typical implementation, the access point 108 allows communication devices 112 holding certain credentials to utilize the access point 108 to connect to resources via the communication network 120. As a particular example, the access point 108 may require the presentation of a predetermined password by a communication device 112, the presentation of a system identifier, and/or other credentials in order to allow a communication device 112 to access the communication network 120 via the access point 108. Accordingly, the access point 108 may present a closed or secured system. Operators of access points 108 generally prefer to implement closed or secured systems, in order to maintain minimum performance standards, and/or to prevent unauthorized access to resources. In addition, by implementing a closed system, the operator of an access point 108 can grant access as a benefit to customers, employees, or other favored parties. However, a closed or secured access point 108 will prohibit attempts to route emergency communications through the access point 108.

Figure 2:
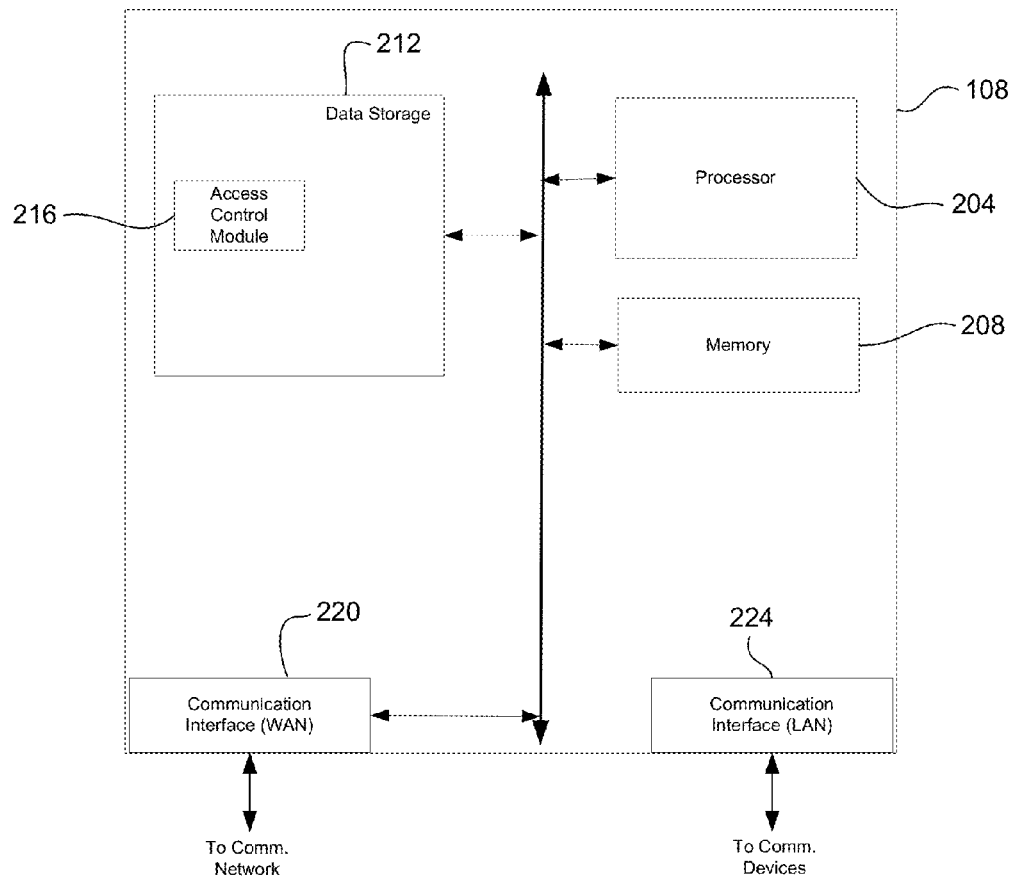
FIG. 2 depicts components of an access point in accordance with embodiments of the present disclosure.

FIG. 2 illustrates components of an access point 108 that provides special handling for certain types of communications in accordance with embodiments of the present disclosure. For example, emergency communications can be allowed to pass through the access point 108, even in connection with a communication device 112 that is not authorized to make use of the access point 108. In general, the access point 108 may comprise a converged device that includes various connectivity components and processors. For example, a processor 204 capable of executing program instructions can be included. The processor 204 may comprise any general purpose programmable processor or controller for executing application programming. Alternatively, the processor 204 may comprise a specially configured application specific integrated circuit (ASIC). The processor 204 generally operates to run programming code implementing various functions performed by the access point 108, including but not limited to the use of the access point 108 by a communication device 112 not otherwise authorized to utilize an access point 108 to connect to a communication network 120 for purposes of emergency communications.

The access point 108 additionally includes memory 208. The memory 208 can be used in connection with the execution of programming by the processor 204, and for the temporary or long term storage of data and/or program instructions. As examples, the memory 208 may comprise a computer readable medium, such as RAM, SDRAM, or other solid state memory. Alternatively or in addition, data storage 212 may be provided. In accordance with embodiments of the present disclosure, the data storage 212 can contain programming code or instructions implementing various of the applications or functions executed or performed by the access point 108. Like the memory 208, the data storage 212 may comprise a computer readable memory, such as RAM, SDRAM, or other solid state memory. Alternatively or in addition, the data storage 212 may comprise another type of tangible computer readable medium, such as a hard disk drive or other random access memory. As an example, the data storage 212 can include an access control module or application 216. The access control module 216 can be executed by the processor 204 to implement access control functions of the access point 108 as described herein, optionally in conjunction with one or more rule sets or filters.

The access point 108 can additionally include various communication interfaces, such as a wide area network (WAN) communication interface 220 to interconnect the access point 108 to a communication network 120, and a local area network (LAN) communication interface 224 to connect the access point 108 to one or more local communication devices 112. Accordingly, an example of a WAN communication interface 220 includes, but is not limited to, an Ethernet connection or port. An example of a LAN communication interface 224 includes a wireless transceiver operating in accordance with IEEE 802.11x standards, commonly referred to as Wi-Fi.

Although certain embodiments of an access point 108 are implemented as a converged device, other arrangements are possible. For example, an access point 108 can include a router component that is interconnected to a separate computer component. In such an arrangement, the computer component can implement and execute the access control module 216, while the router portion provides the physical link to the one or more communication devices 112. In addition, although a LAN communication interface 224 comprising a wireless network can be provided, other types of connections are possible. For example, other wireless interfaces, such as Bluetooth, WiMax, and NFC, are possible. Alternatively or in addition, the LAN communication interface 224 can include a wired interface, for example to accept a connection to a communication device 112 through a wired Ethernet, universal serial bus (USB), or other wired connection.

Figure 3:
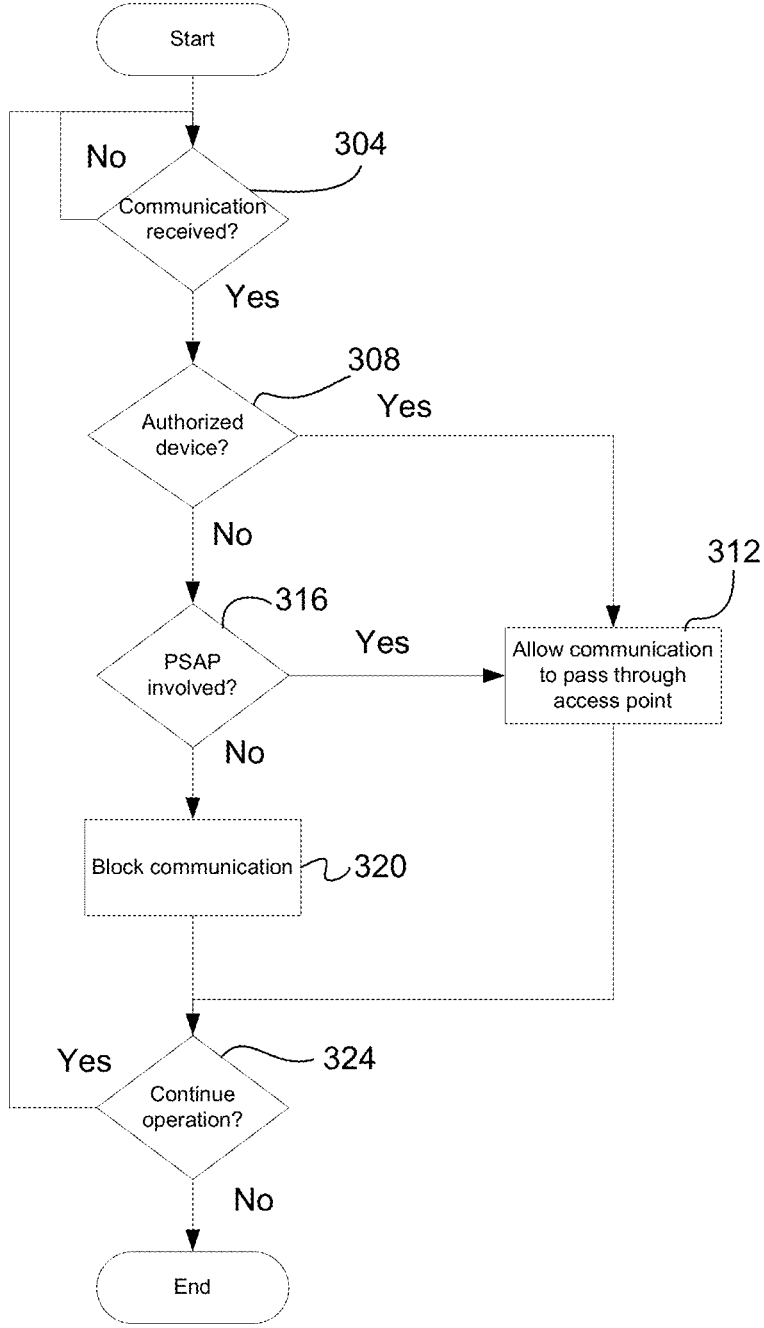
FIG. 3 is a flowchart depicting aspects of a method in accordance with embodiments of the present disclosure.

FIG. 3 illustrates aspects of the operation of a system 100 in accordance with embodiments of the present disclosure. More particularly, this illustrated process can be performed through execution of the access control module 216 by the processor 204 of the access point 108. Initially, at step 304, a determination is made as to whether a communication has been received by the access point 108. Until a communication is received, the process can idle at step 304. Once a communication has been received, a determination is next made as to whether the communication involves an authorized communication device 112 (step 308). In particular, embodiments of the present disclosure are implemented in connection with an access point 108 that generally operates on a closed or secure basis. Accordingly, communications are typically blocked, unless they involve a communication device 112 that has presented necessary credentials to the access point 108. Such access credentials can include, but are not limited to, payment credentials, network identification, and/or a password. If it is determined that the communication device 112 is authorized to use the access point 108, the communication is allowed to pass through the access point (step 312).

If the communication is not associated with an authorized communication device 112, a determination can next be made as to whether a public safety system 124, such as a public safety answering point, is involved in the communication (step 316). For example, the access control module 216 can operate to determine whether data packets comprising the communication are addressed to or received from a public safety system 124 component. Moreover, this determination can be made from an analysis of the address itself, through the presence or absence of a flag, thereby indicating the status of the communication as an emergency communication, or other attribute of the data. If it is determined that a public safety system 124 component is involved in the communication, the communication is allowed to pass through the access point 108 (step 312). Accordingly, the access point 108 can enable communications between a public safety system component 124 and a communication device 112, even where the communication device 112 is not otherwise authorized to engage in communications through the access point 108.

In addition, embodiments of the present disclosure can allow the communication device 112 to access the Internet. For example, any or a limited set of Internet Protocol (IP) addresses may be accessible by the communication device 112 through the access point 108 once the communication device 112 is determined to be included in an emergency communication. These IP addresses may be accessible through associated Uniform Resource Locators (URLs). Where a communication device 112 is to be granted access to a limited set of IP addresses, the URLs associated with the IP addresses, or the IP addresses themselves, may be part of a predefined list maintained on the access point 108 or another node in the system, such as a public safety system 124 component. Moreover, the predefined list may be provided by the public safety system 124 component to the access point 108 for application by the access control module 216 in response to an initial communication from the communication device 112. Accordingly, the communication device 112 can be granted access to information that is important to the safety of the user 116, such as medical guidance or maps that show evacuation routes. Therefore, embodiments of the present disclosure can enable both real time protocol (RTP) voice and/or video communication with a public safety system 124, and access to websites or other sources of information, through a secured access point 108, when an emergency call is placed using an otherwise unauthorized communication device 112. Alternatively or in addition, the communication device 112 may be allowed to access other addresses, including but not limited to telephone numbers.

If it was determined at step 316 that a public safety system 124 component was not involved in the communication, then that communication is blocked (step 320). Accordingly, the access control module 216 continues to enforce the prohibition against use of the access point 108 by unauthorized communication devices 112 with respect to non-emergency communications.

At step 324, a determination can be made as to whether operation of the access point 108 is to continue (step 324). If operation is to continue, the process can return to step 304, to await receipt of a next communication. Alternatively, the process can end.

As can be appreciated by one of skill in the art after consideration of the present disclosure, the access point 108 can operate normally as a limited access or secured access point 108. More particularly, communications received from or addressed to an unauthorized communication device 112 can be blocked by the access point 108. However, if a communication received from or addressed to an unauthorized communication device 112 is an emergency communication, the access point 108 can allow that communication to pass. Moreover, embodiments of the present disclosure permit such use of a secured access point 108 by a communication device 112 even where the service set identifier (SSID) is unpublished, not being broadcast, and/or where other credentials, such as a password, typically required by the access point 108 are not held by or available to the communication device 112. The SSID (or Service Set IDentifier) names and identifies a wireless network. The identifier is something that access points can optionally broadcast to client devices (communication devices) to announce the presence of the access point. The SSID denotes the name of a network on a Wireless Local Area Network (WLAN), and can typically be any name up to thirty-two (32) characters in length.

A communication considered by an access point 108 for special handling is not required to be part of a stream that was initiated on or that is handled entirely by a single access point 108. For example, a first access point 108 executing an access control module 216 in accordance with embodiments of the present disclosure can handle an initial communication or set of communications with a public safety system 124 on behalf of a communication device 112 that is not otherwise authorized to utilize the access point 108. Moreover, a continuation of that communication stream can be handled by a second access point 108. In particular, an access point 108 implementing embodiments of the present invention need only be able to identify that a public safety system 124 is a party to a communication with a communication device 112 that is not generally authorized to utilize the access point 108, in order for the access point 108 to allow the communication. Accordingly, a communication device 112 that is moving between hot spots can maintain a communication session with a public safety system 124, even if the communication device 112 does not have access credentials for the different wireless access points 108.

In accordance with at least some embodiments of the present disclosure, a public safety system 124 component can provide a token to a communication device 112. The token can be used to automatically unlock a second access point 108, for example when the communication device 112 moves from the coverage area of a first wireless access point 108 to the coverage area of a second wireless access point 108. The second wireless access point 108 could be provided with the token, which would automatically unlock the second access point 108 with respect to the communication device 112 holding that token. Accordingly, access can be granted by the second access point 108 without requiring that packets or other data be analyzed to determine whether they are associated with a public access point 124. Moreover, such access can be granted by the second access point 108 where the communication device 112 is engaged in communications involving a website or other resource that were initiated through the first access point 108. In accordance with still other embodiments, a second access point 108 could request information regarding the number called by the communication device 112. Where the communication device 112 is engaged with a public safety system 124, it could echo back 9-1-1 or some other identifier of the public safety system 124. Where a transfer of an in process call between access points 108 is made, embodiments of the present disclosure allow the communication with the public safety system 124 to be maintained without interruption. For example, the data exchanged with the public safety system 124 can include identifying information, such as but not limited to an identifier for the communication device 112. Moreover, such information identifying a communication device 112 can be acquired by the access point 108, and can be provided to the public safety system 124, without the public safety system 124 needing to initiate a request for such information.

In an exemplary scenario, the communication device 112 may comprise a thin client type device capable of supporting communications over a communication network 120. The communication device 112 may be connected to or within the coverage area of an access point 108. The communication device 112 can use the access point 108 for communications, provided credentials required by the access point 108 are presented. For example, in a call center or other enterprise scenario, a user 116 may be required to log on to the communication system 100, which may include providing the credentials required by the access point 108. In an emergency, a user 116 may not at that moment be logged on to the communication system 100, but may have a need to place a call for assistance. Embodiments of the present disclosure can enable such a call to be placed, without requiring that the user 116 first provide the credentials normally required by the access point 108. Similarly, embodiments of the present disclosure allow a person who does not hold required credentials to place an emergency call using an otherwise secured access point 108 and communication device 112.

In accordance with another exemplary embodiment, data inspection (such as packet inspection, header inspection, address inspection, or the like) occurs at the access point 108 to determine whether a particular communication should be allowed to pass through an otherwise secure access point or network.

Assume a user with a communications device 112 is at a location where there is no cellular coverage, but there are WiFi connections available, even though the user has not authenticated to any of the available connections. These WiFi "hotspots" may or may not be broadcasting their SSID, and therefore my not be readily detectable by the communications device 112. The user, needing to contact emergency services, initiates a 9-1-1 communication on their communications device 112 using SIP (Session Initiation Protocol).

A typical SIP Request for an emergency communication could appear similar to:

```
INVITE sip:911user@911server.com SIP/2.0
Via: SIP/2.0/UDP unknown.com/port
To: 911 <sip:911user@911server.com>
From: user <sip:user@server.com>;tag=19298734562
Call-ID: a84r4c86e66710@unknown.com
---- User Message Body Not Shown ----
```

Here, the "To:" field includes an indication that the Request is for a 9-1-1 call. In a typical network environment with closed access points, however, this Request would time-out as there are no network resources available over which to send the communication.

In accordance with one exemplary embodiment, when the communications device 112 transmits the Request, this request is broadcast and received by all the access points within communication range. For closed or secure access points, the access point 108 will reject the packet that includes the Request as the communications device has not been authenticated to that access point. However, since the Request is for emergency services, as reflected by the "To:" field, the access point enters into a special emergency mode.

In accordance with a first embodiment of the emergency mode, the access point 108 knowing the identity of the communications device 112 from the Request, automatically authenticates and shares the SSID with the communications device 112, at which point the Request can be resent using the access point 108 to handle the communication.

Upon being authenticated, the Request is updated to reflect the connection status to the access point 108 and could look similar to:

```
INVITE sip:911user@911server.com SIP/2.0
Via: SIP/2.0/UDP emergency.server1.com/port
To: 911 <sip:911user@911server.com>
From: user <sip:user@server.com>;tag=19298734562
---- User Message Body Not Shown ----
```

Once authenticated, the access point 108 can limit one or more of the destination of traffic to/from the communications device 112 and/or tunnel the 9-1-1 communications to/from through the secure network associated with access point 108.

In accordance with a second exemplary embodiment of the emergency mode, the access point 108 blocks all traffic at all ports except for the port associated with the emergency communication, thereby preserving the security of the "internal" network associated with the access point.

In accordance with a third exemplary embodiment of the emergency mode, the access point 108 does not need to enter a special "emergency mode" since the access point 108 is configured with a port that is always open, and can only be used for emergency communications. For example, the communications over this port can be partitioned from the remaining traffic the access point handles, and using known techniques such as port forwarding, allow communications to a specific destination, e.g., the emergency server, while blocking communications to any other destination. In this manner, a user would only be able to make the 9-1-1 call, and would not be able to access the internet for surfing nor any protected network associated with the access point.

In accordance with a fourth exemplary emergency mode, the access point automatically reconfigures itself such that it can be used for emergency communications. For example, assume in a normal operational mode the access point is secure and does not broadcast any SSID. Upon detecting an emergency communication, such as a SIP INVITE including a "911" identifier, the access point terminates all communications, blocks all ports, except for those to route the emergency communications, switches to an open mode, and begins broadcasting a "911" SSID. The user (or the user's communications device, then seeing this open wireless network available, can initiate the emergency communication. In accordance with an optional exemplary embodiment, information, such as a splash page, can be pushed to the communication device letting the user know the access point is open for the emergency communication an optionally providing instructions for how to connect thereto.

In accordance with another exemplary embodiment, access points are equipped with the ability to have at least 2 SSID's—one being usable in the traditional manner, and the other being only for 9-1-1 communications—optionally being named "911." Communications associated with this 911 SSID can be handled in a manner similar to "guest networks," only allowing certain categories of traffic to be routed to/from a device making an emergency communication.

While the above-described techniques have been discussed in relation to a particular sequence of events, it should be appreciated that changes to this sequence can occur without materially effecting the operation of the embodiments. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols herein can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems described herein is dependent on the speed and/or efficiency requirements of the system, the particular function, and the particular software or hardware systems or microprocessor or microcomputer systems being utilized. The security systems, methods and protocols illustrated herein can be readily implemented in hardware and/or software using any known or later developed systems or structures, devices and/or software by those of ordinary skill in the applicable art from the functional description provided herein and with a general basic knowledge of the computer and security arts.

Moreover, the disclosed methods may be readily implemented in software that can be stored on a non-transitory storage medium, executed on a programmed general-purpose computer with the cooperation of a controller and memory, a special purpose computer, a microprocessor, or the like. In these instances, the systems and methods described herein can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A communication system, comprising:
a first access point, which is not broadcasting a SSID (Service Set Identifier), including:
an access control module, wherein the first access point receives a first communication from a first communication endpoint, the first communication addressed to a public safety system, wherein the access control module recognizes that the first communication endpoint is not authenticated and is attempting to contact the public safety system, wherein the access control module, based on receipt of the first communication and knowing an identity of the first communication endpoint, automatically authenticates the first communication endpoint and transmits the SSID to the first communication endpoint, wherein the access control module then allows receipt of a retransmission of the first communication to pass to a communication network interconnected to the public safety system, and wherein the access control module allows a second communication to pass to at least a first Internet Protocol (IP) address.

2. The system of claim 1, wherein the first access point receives a third communication from the public safety system, wherein the access control module recognizes the third communication as being from the public safety system, and wherein the access control module allows the third communication to be transmitted to the first communication endpoint.

3. The system of claim 2, wherein the public safety system includes at least a first public safety answering point, and wherein the second communication is identified as being from the first public safety answering point.

4. The system of claim 1, wherein the first communication endpoint is a mobile computing device, and wherein the first access point is a Wi-Fi hotspot.

5. The system of claim 4, wherein the first communication is one of a short message system message and an instant message.

6. The system of claim 4, wherein the mobile computing device includes a softphone application, and wherein the first communication is a voice over Internet protocol communication.

7. The system of claim 4, wherein the first communication device includes a cellular telephony capability, and wherein the first communication is not sent using the cellular telephony capability.

8. The system of claim 1, wherein the first IP address is one of a predefined set of IP addresses that the first communication endpoint is allowed to communicate with.

9. The system of claim 1, wherein the access control module requires an access key to enable communications with communication endpoints not included in a public safety system.

10. The system of claim 9, wherein in the absence of receiving the access key from the first communication device the access control module blocks a third communication received from or addressed to the first communication endpoint.

11. A device comprising:
means for receiving a first communication from a first communication device at a first network access point which is not broadcasting a SSID (Service Set Identifier), wherein the first communication device is not authenticated to the first network access point;
means for determining a target of the first communication; and
in response to receiving the first communication, determining that the target for the first communication is a public safety system, and knowing an identity of the first communication device, means for automatically authenticating and transmitting the SSID to the first communication device, then allowing receipt of a retransmission of the first communication to pass from the first network access point to the public safety system through a first network and allowing a second communication to pass from the first network access point to a website through at least one of the first network and a second network.

12. The device of claim 11, wherein the target for the first communication is determined to be a public safety answering point, wherein the first communication is allowed to continue to the first network, and wherein absent a determination that the target for the first communication is a public safety answering point the first and second communications are blocked.

13. The device of claim 11, wherein the second communication is allowed to continue to any one of a predefined set of IP addresses.

14. The device of claim 12, further comprising:
means for determining whether the first communication device has provided an authorization key, wherein the instructions to block the first communication from continuing to a first network in response to determining that the target for the first communication is not a public safety answering point are implemented in response to determining that the first communication device has not provided an authorization key.

15. A method for permitting emergency access to a network, comprising:
receiving a first communication from a first communication device at a first network access point which is not broadcasting a SSID (Service Set Identifier), wherein the first communication device is not authenticated to the first network access point;
determining a target of the first communication;
in response to receiving the first communication, determining that the target for the first communication is a public safety system, and knowing an identity of the first communication device, automatically authenticating and transmitting the SSID to the first communication device, then allowing receipt of a retransmission of the first communication to pass from the first network access point to the public safety system through a first network and allowing a second communication to pass from the first network access point to a website through at least one of the first network and a second network.

16. The method of claim 15, wherein the target for the first communication is determined to be a public safety system, and wherein the first and second communications are allowed to pass from the first network access point to at least one of the first network and the second network.

17. The method of claim 16, further comprising:
receiving a third communication from the public safety system at the first network access point, wherein the third communication is addressed to the first communication device;
passing the third communication from the first network access point to the first communication device.

18. The method of claim 16, further comprising:
receiving a third communication from the public safety system at a second network access point, wherein the third communication is one of addressed to or received from the first communication device;

determining that the third communication is one of received from or addressed to the public safety system;

passing the third communication from the second network access point to the first communication device.

19. The method of claim 18, wherein determining that the third communication is one of received from or addressed to the public safety system includes determining whether the first communication device holds a token received from the public safety system.

20. The method of claim 15, wherein the second communication is allowed to continue to any Internet Protocol addresses associated with a universal resource locator (URL) included in a predefined set of (URLs).

* * * * *